(12) United States Patent
Anikul et al.

(10) Patent No.: US 9,064,261 B2
(45) Date of Patent: Jun. 23, 2015

(54) AUTO-SUGGESTED CONTENT ITEM REQUESTS

(75) Inventors: Alexander Anikul, Brooklyn, NY (US);
Arun Mathew, New York, NY (US);
Jocelyn Miller, Hoboken, NJ (US);
Prashant Kumar, Sunnyvale, CA (US);
Sandeep Jain, New York, NY (US)

(73) Assignee: Google Inc., Mountain View, CA (US)

( * ) Notice: Subject to any disclaimer, the term of this patent is extended or adjusted under 35 U.S.C. 154(b) by 1027 days.

(21) Appl. No.: 13/112,531

(22) Filed: May 20, 2011

(65) Prior Publication Data

US 2012/0297308 A1    Nov. 22, 2012

(51) Int. Cl.
| G06F 15/177 | (2006.01) |
| G06F 3/00 | (2006.01) |
| G06F 17/00 | (2006.01) |
| G06Q 30/02 | (2012.01) |

(52) U.S. Cl.
CPC ..................... G06Q 30/02 (2013.01)

(58) Field of Classification Search
CPC . G06F 17/3089; G06F 17/2725; G06F 17/27; G06F 17/30864; G06Q 30/02
USPC ................. 715/203, 208, 705, 735–736, 738, 715/741–743, 747, 749, 760
See application file for complete search history.

(56) References Cited

U.S. PATENT DOCUMENTS

| 6,009,459 | A  | * | 12/1999 | Belfiore et al. ............... 709/203 |
| 6,584,508 | B1 | * | 6/2003 | Epstein et al. ................ 709/229 |
| 7,010,537 | B2 | * | 3/2006 | Eyal et al. ............................. 1/1 |
| 7,324,972 | B1 | * | 1/2008 | Oliver et al. .................... 705/40 |
| 7,631,101 | B2 | * | 12/2009 | Sullivan et al. ............... 709/245 |
| 7,997,485 | B2 | * | 8/2011 | Flake et al. .................... 235/383 |
| 8,132,091 | B2 | * | 3/2012 | Nabutovsky .................. 715/206 |
| 8,185,930 | B2 | * | 5/2012 | Alperovitch et al. ............. 726/1 |
| 8,595,097 | B2 | * | 11/2013 | Lejano et al. ................... 705/35 |
| 8,769,440 | B2 | * | 7/2014 | Hoyle ............................ 715/854 |
| 2003/0149742 | A1 | * | 8/2003 | Bollerud ....................... 709/217 |
| 2004/0083424 | A1 | * | 4/2004 | Kawai et al. ................ 715/501.1 |
| 2006/0041837 | A1 | * | 2/2006 | Amir et al. .................... 715/513 |
| 2006/0101341 | A1 | * | 5/2006 | Kelly et al. ................... 715/738 |
| 2007/0061246 | A1 | * | 3/2007 | Ramer et al. .................... 705/37 |
| 2007/0130327 | A1 | * | 6/2007 | Kuo et al. ..................... 709/224 |

(Continued)

OTHER PUBLICATIONS

Authorized officer Chung Keun Lee, International Search Report and Written Opinion in PCT/US2012/038578, mailed Nov. 29, 2012, 13 pages.

*Primary Examiner* — Andrew Tank
(74) *Attorney, Agent, or Firm* — Fish & Richardson P.C.

(57) ABSTRACT

Methods, systems, and apparatus, including computer programs encoded on a computer-readable storage medium, including a method comprising: receiving a content item request from a resource, the resource associated with a resource sponsor; verifying the content item request including filtering out spam requests and determining if the content item request is valid; for any invalid requests, providing a content item in response to the content item request that is in conformance with an existing definition provided by the resource sponsor; and presenting information related to invalid requests to the resource sponsor in a user interface, the user interface including tools for enabling the resource sponsor to automatically accept and validate a content item request so that subsequent requests of the same type are validated upon receipt.

28 Claims, 7 Drawing Sheets

(56) References Cited

U.S. PATENT DOCUMENTS

| | | |
|---|---|---|
| 2007/0266150 A1 | 11/2007 | Lee et al. |
| 2007/0282874 A1 | 12/2007 | Metcalfe |
| 2008/0082687 A1* | 4/2008 | Cradick et al. ............... 709/246 |
| 2008/0195483 A1* | 8/2008 | Moore ............................ 705/14 |
| 2008/0306815 A1 | 12/2008 | Dykes et al. |
| 2010/0106571 A1 | 4/2010 | Catorcini et al. |

* cited by examiner

AUTO-SUGGESTED CONTENT ITEM REQUESTS

BACKGROUND

This specification relates to information presentation.

The Internet provides access to a wide variety of resources. For example, video and/or audio files, as well as web pages for particular subjects or particular news articles, are accessible over the Internet. Access to these resources presents opportunities for other content (e.g., advertisements) to be provided with the resources. For example, a web page can include slots in which content can be presented. These slots can be defined in the web page or defined for presentation with a web page, for example, along with search results.

Content item slots can be allocated to content sponsors through a reservation system. For example, publishers can contract with content publishers to publish content items in content slots that are associated with one or more publisher properties. When a content request identifying a particular content slot is received, a content management system associated with the publisher can serve the content items in accordance with any number of rules so as to ensure that the contract terms of the various contracts are satisfied.

SUMMARY

In general, one innovative aspect of the subject matter described in this specification can be implemented in methods that include a method comprising: receiving a content item request from a resource, the resource associated with a resource sponsor; verifying the content item request including filtering out spam requests and determining if the content item request is valid; for any invalid requests, providing a content item in response to the content item request that is in conformance with an existing definition provided by the resource sponsor; and presenting information related to invalid requests to the resource sponsor in a user interface, the user interface including tools for enabling the resource sponsor to automatically accept and validate a content item request so that subsequent requests of the same type are validated upon receipt.

These and other implementations can each optionally include one or more of the following features. The resource can be a webpage and the resource sponsor can be a publisher of the webpage. Verifying the content item request can include verifying details associated with a content item slot associated with the request including examining a tag associated with the content item request. Filtering spam requests can include filtering requests based on black lists. Determining if the content item request is valid can include determining if the content item request includes a content item slot definition that is valid. Determining if the content item slot definition is valid can include evaluating terms in a tag associated with the content item request. Determining if the content item request is valid can include determining if a content item request is invalid, where an invalid request can be of the form of a request that includes a tag that includes one or more typographical errors that are correctable. Determining if the content item request is valid can include determining an advertisable entity that is associated with the content item request, and method can further comprise determining if the content item request is invalid and includes an invalid advertisable entity specification. The advertisable entity can be a content item slot definition that includes parameters defining how content is to be presented on the resource. Determining the advertisable entity is invalid can further include determining one or more characteristics of the content item slot definition that are invalid generally or invalid specifically for the resource sponsor. For any invalid requests, providing a content item in response to the content item request can further include identifying at least one advertisable entity that is associated with the resource sponsor and providing a content item that is in conformance to the identified advertisable entity. The identified advertisable entity can define a content slot specified by the resource sponsor. Presenting can further include presenting suggestions for valid advertisable entities based at least in part on the received invalid content item requests. The invalid content item requests can include invalid content item slot definitions. Presenting can further include logging invalid content item request. The method can further comprise identifying an invalid content item request and automatically determining a fix for the invalid content item request, where the method of presenting information related to invalid content item requests can include presenting invalid content items that have been fixed. Presenting information can include presenting a tool to enable a user to fix an invalid content item request. Presenting information can include presenting a tool to enable a resource sponsor to accept a suggested valid advertisable entity.

In general, another innovative aspect of the subject matter described in this specification can be implemented in methods that include a method comprising: receiving a content item request, where any content item received responsive to the content item request is to be displayed on a resource, the resource having an associated resource sponsor; determining whether the content item request is valid or invalid; for valid requests, providing content responsive to the content item request; for invalid requests, determining whether the invalid request is spam, and if so, not providing a content item in response to the content item request; for invalid requests, determining whether the invalid request is improperly formatted, and if so, providing a content item responsive to the content item request including selecting a content item based at least in part on a parameter description previously provided by the resource sponsor; and for invalid requests, determining whether the invalid request is a request for a missing advertisable entity in a hierarchy of advertisable entities; and if so, providing a content item responsive to the content item request including selecting a content item based on another advertisable entity in the hierarchy associated with the resource sponsor.

These and other implementations can each optionally include one or more of the following features. The advertisable entities can be content item slot definitions.

In general, another innovative aspect of the subject matter described in this specification can be implemented in methods that include a method comprising: determining one or more invalid content item requests that are received from a property associated with a property sponsor; logging the invalid content item request; and presenting in a user interface to the property sponsor information related to the invalid content item requests.

These and other implementations can each optionally include one or more of the following features. An invalid content item request can include an invalid advertisable entity. The advertisable entity can be a content item slot definition. Presenting information can include presenting suggestions to the resource sponsor for valid advertisable entities. Presenting information can include presenting the invalid content item requests that were received including a count of a number of invalid requests received. Presenting information can include identifying from the log an invalid content item request, determining a fix for correcting the invalid content item request, and automatically correcting the invalid content item request and where presenting includes presenting the corrected invalid content item request. Presenting information can include presenting a tool for accepting one or more presented content item requests as being valid. Presenting information can include presenting information for fixing one or more of the invalid content item requests.

In general, another innovative aspect of the subject matter described in this specification can be implemented in systems that include a system comprising: a content management system that provides content items responsive to received requests, the content management system including a request handler, a verification engine, and a suggestion engine; where the request handler is enabled to receive content item requests and provide content items in response to the received content item requests; where the verification engine is enabled to verify content item requests and to determine whether the content item requests are valid or invalid; and where the suggestion engine is enabled to automatically generate suggested advertisable entities based, at least in part, on invalid content item requests.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This document describes methods, processes and systems for which content item requests (e.g., requests for ads) that are invalid can be used to automatically generate suggested advertisable entities (e.g., content item slot definitions). For example, a request for an ad may originate from an ad slot on a resource sponsor's web page. If no errors are detected in the corresponding content item request, content responsive to the content item request can be served. However, in some examples, the tag (e.g., HTML code including parameters used to request an ad for the slot) or other information associated with the content item request may contain one or more errors. For example, errors may be introduced by a software developer, web page master, or other content author who created the tag or copied the tag from code for another web page. In some implementations, when one or more errors exist in the content item request, content responsive to the request can still be served. For example, corrections to erroneous information in the content item request can be determined automatically based on the format and content of content items requests expected for that resource provider, allowing content items responsive to the request to be served. Alternatively, a predetermined format can be used and content served that is in conformance to the predetermined format. In other examples, however, corrections cannot be determined for errors in the content item request, and no content is provided. Invalid content item requests can be logged over time. User interfaces available to resource sponsors (or web pages publishers) can display suggested advertisable entities that are based on the invalid content item requests. Resource sponsors can view, edit and approve the suggestions, and the information can be used to correct the erroneous information, such as the tags that are used in requesting content items. For example, a suggested advertisable entity can be a content item slot definition that includes parameters defining how content is to be presented on the resource.

Figure 1:
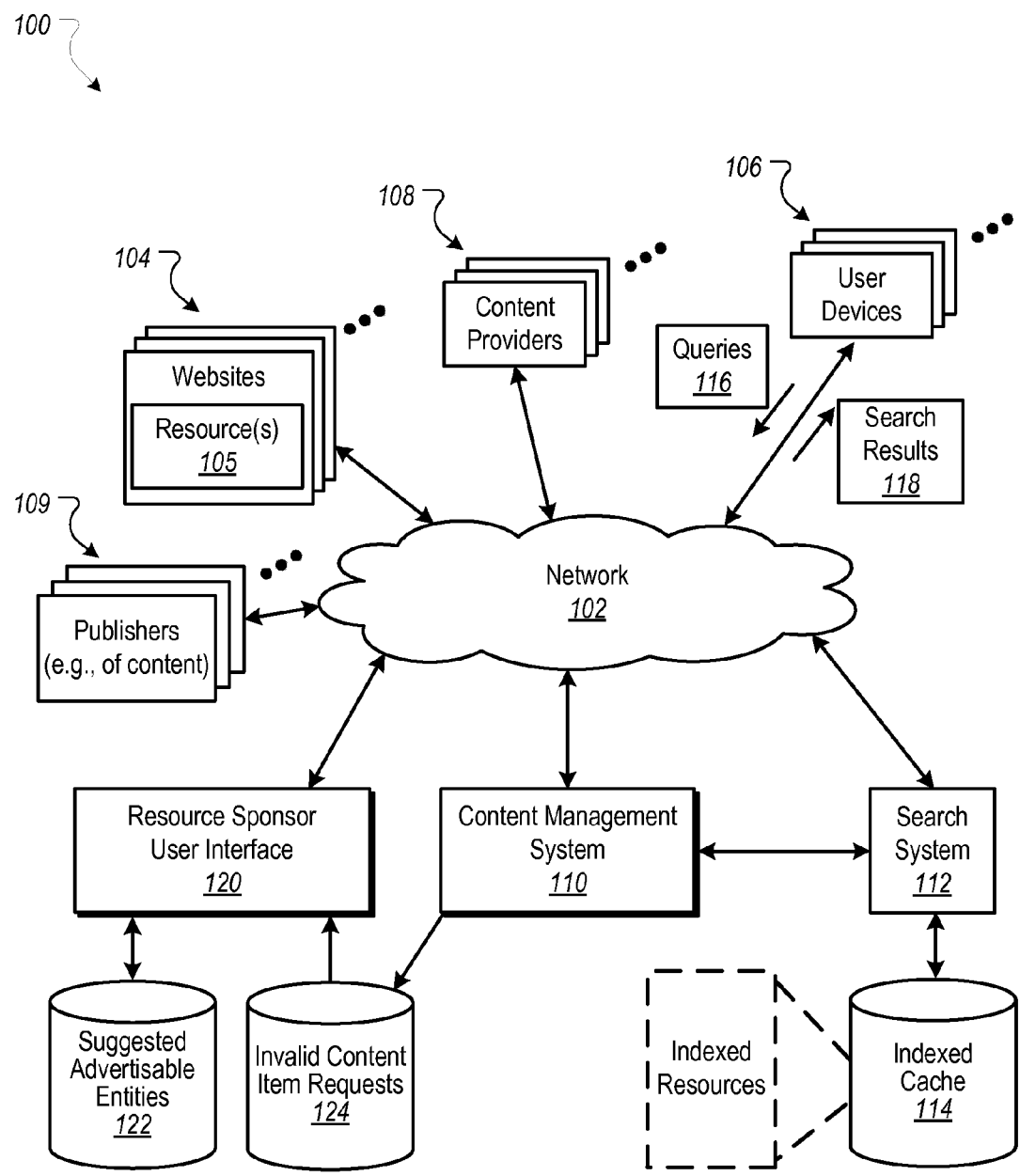
FIG. 1 is a block diagram of an example environment for automatically suggesting advertising entities from received invalid requests for content.

FIG. 1 is a block diagram of an example environment 100 for automatically suggesting advertising entities from received invalid requests for content. The example environment 100 includes a content management system 110 for selecting and providing content in response to requests for content. The example environment 100 includes a network 102, such as a local area network (LAN), a wide area network (WAN), the Internet, or a combination thereof. The network 102 connects websites 104, user devices 106, content providers 108 (e.g., resource sponsors), publishers 109, and the content management system 110. The example environment 100 may include many thousands of websites 104, user devices 106, content providers 108, and publishers 109.

A website 104 includes one or more resources 105 associated with a domain name and hosted by one or more servers. An example website is a collection of web pages formatted in hypertext markup language (HTML) that can contain text, images, multimedia content, and programming elements, such as scripts. Each website 104 can be maintained by a content publisher, which is an entity that controls, manages and/or owns the website 104.

A resource 105 can be any data that can be provided over the network 102. A resource 105 can be identified by a resource address that is associated with the resource 105. Resources include web pages, HTML pages, word processing documents, portable document format (PDF) documents, images, video, and news feed sources, to name only a few. The resources can include content, such as words, phrases, images and sounds, that may include embedded information (such as meta-information hyperlinks) and/or embedded instructions (such as JavaScript scripts).

A user device 106 is an electronic device that is under control of a user and is capable of requesting and receiving resources over the network 102. Example user devices 106 include personal computers, mobile communication devices (e.g., smartphones), and other devices that can send and receive data over the network 102. A user device 106 typically includes one or more user applications, such as a web browser, to facilitate the sending and receiving of data over the network 102.

A user device 106 can request resources 105 from a website 104. In turn, data representing the resource 105 can be provided to the user device 106 for presentation by the user device 106. The data representing the resource 105 can also include data specifying a portion of the resource or a portion of a user display, such as a presentation location of a pop-up window or a slot of a third-party content site or web page, in which content can be presented. These specified portions of the resource or user display are referred to as slots (e.g., ad slots).

To facilitate searching of these resources, the environment 100 can include a search system 112 that identifies the resources by crawling and indexing the resources provided by the content publishers on the websites 104. Data about the resources can be indexed based on the resource to which the data corresponds. The indexed and, optionally, cached copies of the resources can be stored in an indexed cache 114.

User devices 106 can submit search queries 116 to the search system 112 over the network 102. In response, the search system 112 accesses the indexed cache 114 to identify resources that are relevant to the search query 116. The search system 112 identifies the resources in the form of search results 118 and returns the search results 118 to the user devices 106 in search results pages. A search result 118 is data generated by the search system 112 that identifies a resource that is responsive to a particular search query, and includes a link to the resource. In some implementations, the content management system 110 can generate search results 118 using information (e.g., identified resources) received from the search system 112. An example search result 118 can include a web page title, a snippet of text or a portion of an image extracted from the web page, and the URL of the web page. Search results pages can also include one or more slots in which other content items (e.g., ads) can be presented.

When a resource 105, search results 118 and/or other content are requested by a user device 106, the content management system 110 receives a request for content to be provided with the resource 105 or search results 118. The request for content can include characteristics of the slots that are defined for the requested resource or search results page, and can be provided to the content management system 110.

For example, a reference (e.g., URL) to the resource for which the slot is defined, a size of the slot, and/or media types that are available for presentation in the slot can be provided to the content management system 110. Similarly, keywords associated with a requested resource ("resource keywords") or a search query 116 for which search results are requested can also be provided to the content management system 110 to facilitate identification of content that is relevant to the resource or search query 116.

Based at least in part on data included in the request, the content management system 110 can select content that is eligible to be provided in response to the request ("eligible content items"). For example, eligible content items can include eligible ads having characteristics matching the characteristics of ad slots and that are identified as relevant to specified resource keywords or search queries 116.

However, in some examples, some content item requests that the content management system 110 receives may be invalid. For example, ad requests for ads to fill ad slots on a resource 105 (e.g., a web page) can contain errors. In some examples, content items requests can use tags, which include HTML code that a browser can use to request an advertisement from an ad server. The received request may be invalid for various reasons, such as if the tag includes a parameter, field name, field value, etc. that is not recognized by the content management system 110. Another example of an invalid content item request is a request that contains a typographical error, such as a misspelled term in a tag. The request may be invalid because the request includes characteristics that are invalid in general for all resource sponsors (e.g., invalid syntax) and/or invalid specifically for a particular resource sponsor. In other examples, the request may be invalid because the request is a spam request, originating from an unauthorized web site, such as can be determined from black lists of known spam IP addresses, URLs, etc. In some implementations, invalid requests that the content management system 110 receives can be stored as invalid content item requests 124, e.g., to be used later to automatically generate suggested advertisable entities.

When valid requests for content are received, the content management system 110 can provide a content item in response to the request. In some implementations, when invalid requests for content are received, the content management system 110 can, in some examples, provide content items in response to the request. For example, if the content management system 110 determines (e.g., using a validity engine) that the request contains a correctable typographical error, the error can be corrected and a content item served. In some implementations, the content management system 110 can use a predetermined or existing default format for the publisher and serve content in accordance with the predetermined or default format.

A resource sponsor user interface 120 can allow resource sponsors (e.g., publishers 109) to perform operations based on invalid content item requests 124 that are received. For example, suggested advertisable entries 122 can be generated from the invalid content item requests 124. In some implementations, the resource sponsor user interface 120 can use a suggestion engine to create suggested advertisable entries 122 from received invalid content item requests 124, such as when requested by a user of the resource sponsor user interface 120, on a scheduled basis, or when a threshold number of invalid content items requests of the same type have been received.

Figure 2:
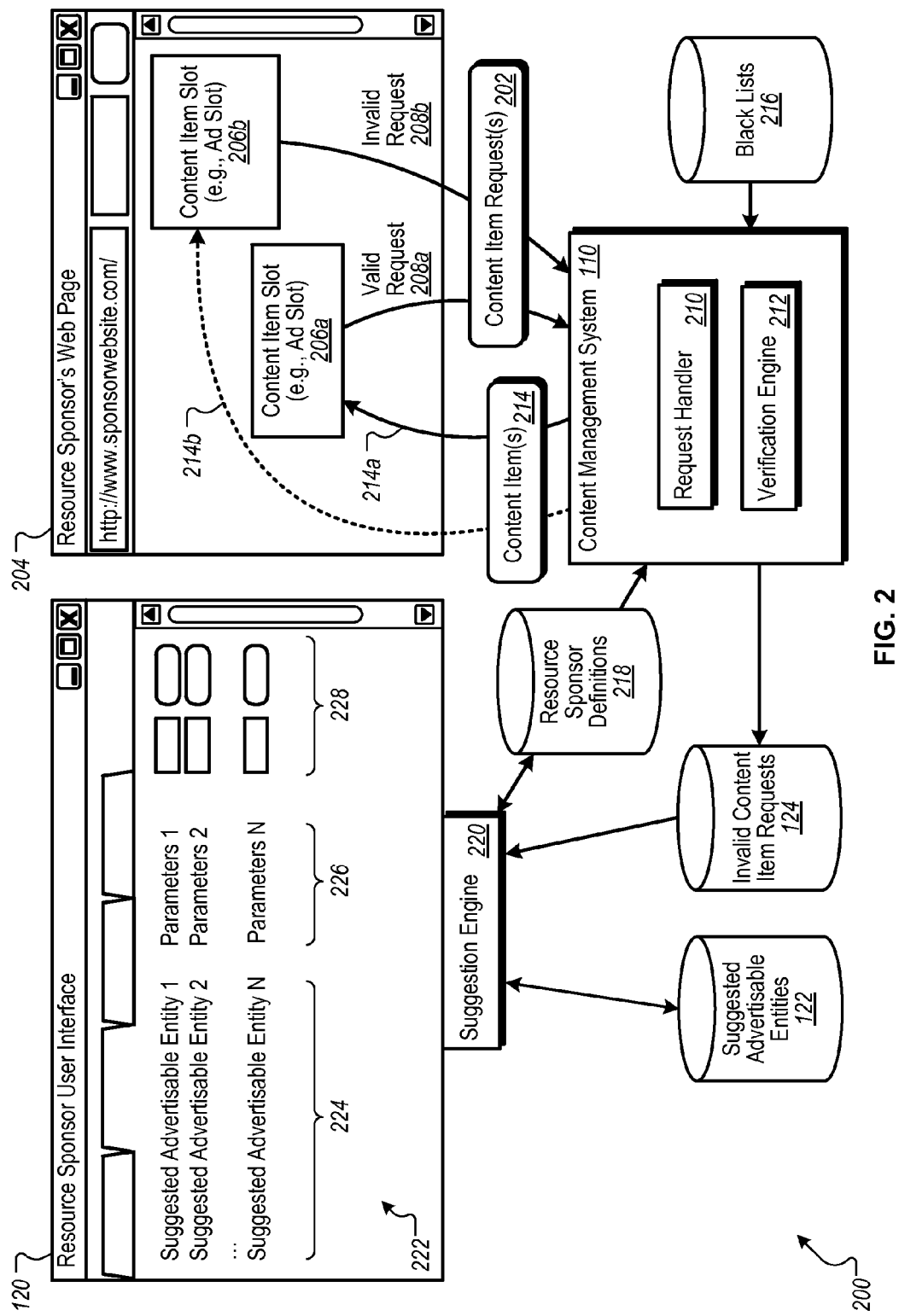
FIG. 2 is a block diagram showing an example system for automatically suggesting advertising entities from received invalid requests for content.

FIG. 2 is a block diagram showing an example system 200 for automatically suggesting advertising entities from received invalid requests for content. As an example, the resource sponsor user interface 120 can present suggested advertisable entities 122 that are generated from invalid content item requests (e.g., an invalid content item request 202) received by the content management system 110 from a resource sponsor's web page 204.

The content item request 202 that the content management system 110 receives can be, for example, a request for content to fill a content item slot on a resource, such as the resource sponsor's web page 204. For example, content item slots 206a and 206b can be ad slots or any other kind of content item slots. Ad slots, for example, can be ad slots for blocks of ads, or ad slots for ads that are embedded in other content included on the resource sponsor's web page 204. In some examples, such as for a valid request 208a, the content item request 202 can be valid, meaning that the information in the content item request 202 contains correct information, e.g., that can be used by the content management system 110 to provided content in response to the request. However, in other examples, such as in an invalid request 208b, the content item request 202 can be invalid, meaning that the information in the content item request 202 contains incorrect information. One example kind of incorrect information includes a spam request, e.g., when the content item request 202 is received from a resource that is known (or suspected) to be an illegitimate web page (e.g., not the resource sponsor's web page 204). Other example kinds of incorrect information include typographical errors, parameters known to be incorrect or missing for the resource sponsor, or parameters requesting a content item that does not exist.

The content management system 110 can include plural engines for processing the content item request 202 that it receives from the resource sponsor's web page 204. In some implementations, the content management system 110 includes a request handler 210 that can receive the content item request 202 and determine content that is responsive to the request (e.g., the valid request 208a). As described earlier, the content management system 110 (and specifically the request handler 210) can use information received from the search system 112 in handling the request. In some implementations, the content management system 110 includes a verification engine 212 for determining whether content items requests 202 are valid or invalid. For example, the verification engine 212 can verify details associated with a content item slot definition associated with the request including examining a tag associated with the content item request. As a result, the verification engine 212 can determine that the content item slot definition is invalid, e.g., one or more of the parameters defining how content is to be presented on the resource are incorrect.

For each valid request 208a that is received, the request handler 210 can provide one or more content items 214 responsive to the valid request 208a. As indicated by a solid line 214a accompanying the content item 214, content responsive to the valid request 208a can be provided for use in the content item slot 206a. In this example, the solid line 214a is solid because content items can generally always be served for valid requests.

For each invalid request 208b that is received by the content management system 110, the verification engine 212 can determine the request's validity in various ways, such as ways that can determine that the request is spam-related. For example, the verification engine 212 can verify content item requests 202, and at the same time, filter out spam requests. In some implementations, a black lists data store 216 can contain lists of known spam IP addresses, URLs, and/or other identifiers or information that can be used to determine, for example, that the content item request 202 that is received has originated from a spam web site. For example, the verification engine 212 can compare the IP address corresponding to the content item request 202 with IP addresses stored in the black lists data store 216. In some implementations, the verification engine 212 can compare the URL corresponding to the content item request 202 with URLs that are stored in the black lists data store 216. Other ways for determining spam-related requests can be used.

The verification engine 212 can use other ways to determine whether the request is valid or invalid, such as by evaluating the content of the request with reference to information associated with the resource sponsor (e.g., publisher). In some implementations, determining whether a request is valid or invalid includes determining one or more characteristics of the content item slot definition that are invalid generally or invalid specifically for the resource sponsor. Some implementations, for example, include resource sponsor definitions 218 that store information specific to resource sponsors, such as information identifying the expected format and content of content items requests 202 received for each resource sponsor. For example, information that is specific to a resource sponsor can include level names of levels that are used to identify a hierarchical name used for advertisable entities corresponding to that resource sponsor. The information can be used, for example, to identify named elements that are expected to be found in tags associated with content item slots on that resource sponsor's web pages. For example, the hierarchical names can correspond to a resource sponsor's collection of web pages.

In one example of information stored in resource sponsor definitions 218, a resource sponsor having a collection of music-related web pages may identify its advertisable entities using a hierarchy (e.g., "artists>jazz>trumpet"). In this example, "artist" represents the highest level in the hierarchy, "jazz" the middle level, and "trumpet" the lowest level. In some implementations, when validating the content item request 202, the verification engine 212 can use hierarchy information (or other naming mechanisms) in the resource sponsor definitions 218 to determine invalid parameters. In some implementations, parameters may be determined to be invalid when a level is missing from a hierarchical name. For example, "jazz" (or some other middle level name) may be missing from a content item request that includes "artists>NULL>trumpet." In another example, the instrument (e.g., "trumpet") missing from a content item request that includes "artists>jazz>NULL."

In some implementations, even though some of the information in the content item request 202 is invalid, the verification engine 212 can still determine a content item 214 that is responsive to the request. For instance, in the former example, the verification engine 212 can automatically fill in the missing "jazz" level in "artists>NULL>trumpet," and the content management system 110 can provide the corresponding content item 214 based on "artists>jazz>trumpet." Similarly, in the latter example, the verification engine 212 can automatically fill in the missing "trumpet" level (or some other instrument) in "artists>jazz>NULL," and the content management system 110 can provide the corresponding content item 214. As a result, as indicated by a dashed line 214b, some invalid requests 208b received by the content management system 110 can result in providing content items 214 in response to the requests. The content items 214 that the content management system 110 can provide in these examples are in conformance with existing definitions provided by the resource sponsor, e.g., having complete and valid names at all levels in name hierarchies.

In some implementations, the verification engine 212 can determine when a typographical error exists, e.g., the misspelled "jaz" in "artist>jaz>trumpet," or "trumpeter" instead of "trumpet" in "artist>jazz>trumpeter." In this example, the verification engine 212 can automatically correct the invalid information, and the content management system 110 can still provide the content items 214 in response to the (invalid) content item request 202.

Regardless of whether the invalid request 208b is recoverable (e.g., in the sense that the content items 214 can still be provided) or not, the content management system 110 can store information for all invalid requests in the invalid content item requests 124. For example, this can occur repeatedly over time, such as whenever the content management system 110 receives invalid requests 208b associated with the content item slot 206b on the resource sponsor's web page 204. Similarly, other invalid requests associated with content item slots on other web pages can be received. Information for each of these invalid requests can be stored as they occur over time in the invalid content item requests 124. In some implementations, the information in the invalid content item requests 124 can be indexed or sorted by resource sponsor, web page, content item slot, and/or other elements associated with invalid content item requests. In some implementations, information about multiple instances of the invalid request 208b can be summarized as a single entry in the invalid content item requests 124, and whenever an invalid request 208*b* having the same information is received by the content management system 110, a counter for that entry can be incremented.

In some implementations, when a threshold number of invalid content item requests have been received for a given web page (e.g., based on a count), a suggestion engine 220, for example, can make suggestions (e.g., suggested advertisable entities) that can be used by the resource sponsor to correct the invalid requests. In some implementations, information corresponding to the suggestions can be stored in the suggested advertisable entities 122. Information related to suggested advertisable entities and invalid requests received over time can be presented to the resource sponsors, such as in the resource sponsor user interface 120.

The suggestion engine 220, for example, can generate suggested advertisable entities 122 using one or more invalid content item requests 124 for the same resource sponsor, web page, etc. The suggestions that the suggestion engine 220 makes, for example, can be based on information (e.g., missing hierarchy levels, typos, etc.) at least in part using information determined by the verification engine 212 before storage of the information in the invalid content item requests 124.

In some implementations, the resource sponsor user interface 120 can present suggestion information 222 for suggested advertisable entities with tools for enabling the resource sponsor to automatically accept and validate an invalid content item request so that subsequent requests of the same type can be validated upon receipt. For example, information displayed in the suggestion information 222 can be obtained from suggested advertisable entities 122 and can include suggestions 224, parameters 226 and options 228. Each row in the information 222 can correspond to a different suggested advertisable entity (e.g., one of "Suggested Advertisable Entities 1-N"). For example, the suggestion 224 "Suggested Advertisable Entity 2" can correspond to one or more invalid requests 208*b* corresponding to the content item slot 206*b*, while the suggestion 224 "Suggested Advertisable Entity 1" can correspond to invalid content item requests from a different web page for the resource sponsor. In some implementations, parameters 226 can include information such as the number of times that the invalid content item request was received, the position of the content item slot on the web page, and so on. Options 228, for example, can allow a resource sponsor to display information about the suggestion and/or the corresponding invalid content item request. Options 228 can also include controls by which the resource sponsor can view and then optionally accept a suggested advertisable entity. A more detailed example of the resource sponsor user interface 120 will be described later with reference to FIG. 3.

In some implementations, invalid content item requests that are spam-related can be presented to resource sponsor in various reports that are not shown in the resource sponsor user interface 120. In these examples, while the suggestion engine 220 makes no suggestions for fixing spam-related requests, information regarding the spam request can help the resource sponsor determine the source of the spam requests. For example, using information about the spammer's IP address, URL(s), etc., the resource sponsor can decide whether to pursue attempts to stop the source of the spam requests. In some implementations, information (e.g., an IP address or other key) stored in the invalid content item requests 124 for a spam-related request can be used to look up additional spammer information (e.g., the spammer's web site(s)) in the black lists 216.

Figure 3:
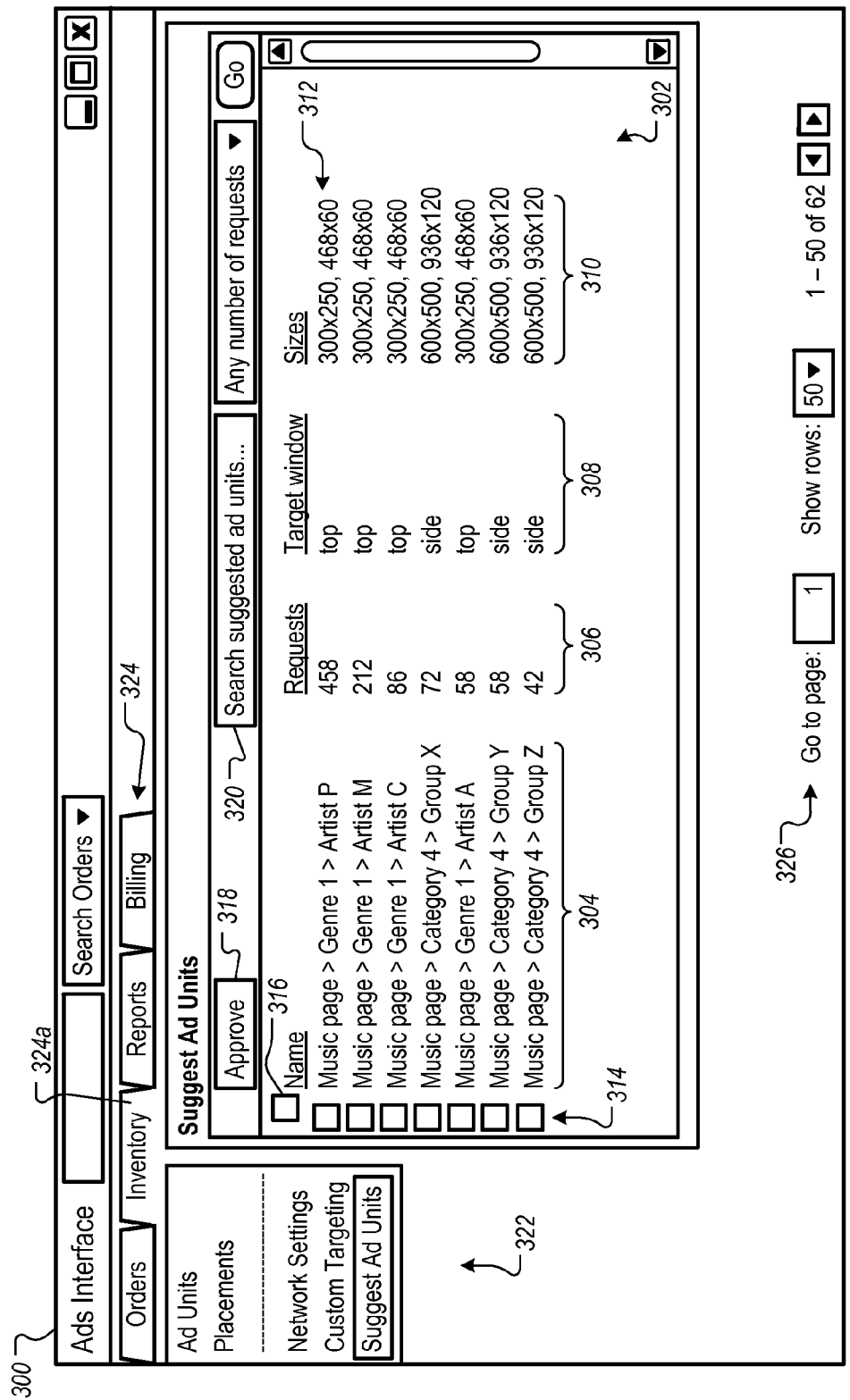
FIG. 3 is a screen shot of an example user interface for reviewing, correcting and approving advertisable entities generated automatically from invalid requests for content.

FIG. 3 is a screen shot of an example user interface 300 for reviewing, correcting and approving advertisable entities generated automatically from invalid requests for content. In this example, suggestion information 302 can include information accessed from the suggested advertisable entities 122. In some implementations, the suggestion information 302 can include suggested advertisable entity names 304, invalid request counts 306, target window locations 308, and content item slot sizes 310, as well as other information. For example, an entry 312 that has the suggested advertisable entity name 304 "Music page>Genre 1>Artist P" can correspond to a web page for Artist P within a group or category of "Genre 1" web pages in a collection of music-related web pages sponsored by the resource sponsor. In this example, a count of 458 invalid content item requests have been received for a page-top positioned content item slot having sizes 300×250 and 468×60.

In some implementations, the user interface 300 can include one or more other screens in which information for each invalid content item request is presented including a tool to enable a user to fix the invalid content item request. For example, while some invalid content item requests can result in automatically suggested advertisable entities, some invalid content item requests can include errors that cannot be fixed automatically.

In some implementations, the suggestion information 302 can be sorted in various ways. For example, the suggestion information 302 can be sorted in descending order by invalid request counts 306 so that the entry 312, having the highest count (e.g., 458), appears as the first entry of the suggestion information 302. In some implementations, the suggestion information 302 can be sorted by suggested advertisable entity name 304 or some other column.

In some implementations, selecting an entry (e.g., clicking on the entry 312) can cause detailed information for the suggestion to be displayed. For example, the detailed information can include the reason that the content item requests associated with the suggestion were invalid (e.g., missing hierarchy levels, typographical errors, etc.).

In some implementations, one or more additional screens can allow the user to fix invalid content item requests for which the suggestion engine 220 was unable to generate suggested advertisable entities. For example, the additional screens can display an invalid content item request and identify the errors. The user can manually correct any errors in the invalid content item request to produce an entry that may be valid or that can be fed into the suggestion engine 220 to generate suggested advertisable entities.

A resource sponsor can approve suggested advertisable entities in various ways. For example, approval checkboxes 314, e.g., one for each of the suggestion entries in the suggestion information 302, can allow the resource sponsor to approve individual suggestions. In some implementations, selecting (e.g., clicking on) an approval checkbox 314 can indicate (e.g., with a checkmark that appears in the checkbox) that the corresponding suggestion entry can be approved. Re-clicking an approval checkbox 314 that is already checked, for example, can uncheck the checkbox. In some implementations, a check-all control 316 can cause all of the approval checkboxes 314 to become checked, or cause all of the approval checkboxes 314 to become unchecked if they are already checked. As result, by checking and unchecking approval checkboxes 314, the resource sponsor can identify which suggested advertisable entities are to be approved. In some implementations, the suggested advertisable entities can be content item slot definitions that include parameters that define how content is to be presented on the resource.

An approve control 318, when selected, can cause currently identified suggested advertisable entities to be approved. As a result of a suggested advertisable entity becoming approved, subsequent content items requests of the same type can be validated upon receipt. For example, subsequent times that the content management system 110 receives another instance of the heretobefore invalid request 208b can result in automatically providing content items 214 in response to the request.

Other controls 320 can exist that the resource sponsor can use, for example, to search for specific (or groups of) suggested advertisable entities. Additions controls 320 can allow the resource sponsor to change the threshold by which suggestion information 302 is displayed, e.g., all suggested advertisable entities, or just the suggested advertisable entities that correspond to groups of invalid requests numbering 50 or more. In some implementations, other controls can exist, such as to sort the information or to control which information is displayed.

In some implementations, the suggestion information 302 can be accessible within the user interface 300 based, for example, on one or more options 322 (e.g., "Suggest Ad Units") that can be available under an ad unit inventory tab 324a, which may be one of several tabs 324 available in the user interface 300. Other user interfaces can exist that present the information for suggested advertisement entities and invalid content item requests in other ways. In some implementations, page controls 326 can allow the user to control the number of entries on a page or to navigate to specific pages.

Figure 4A:
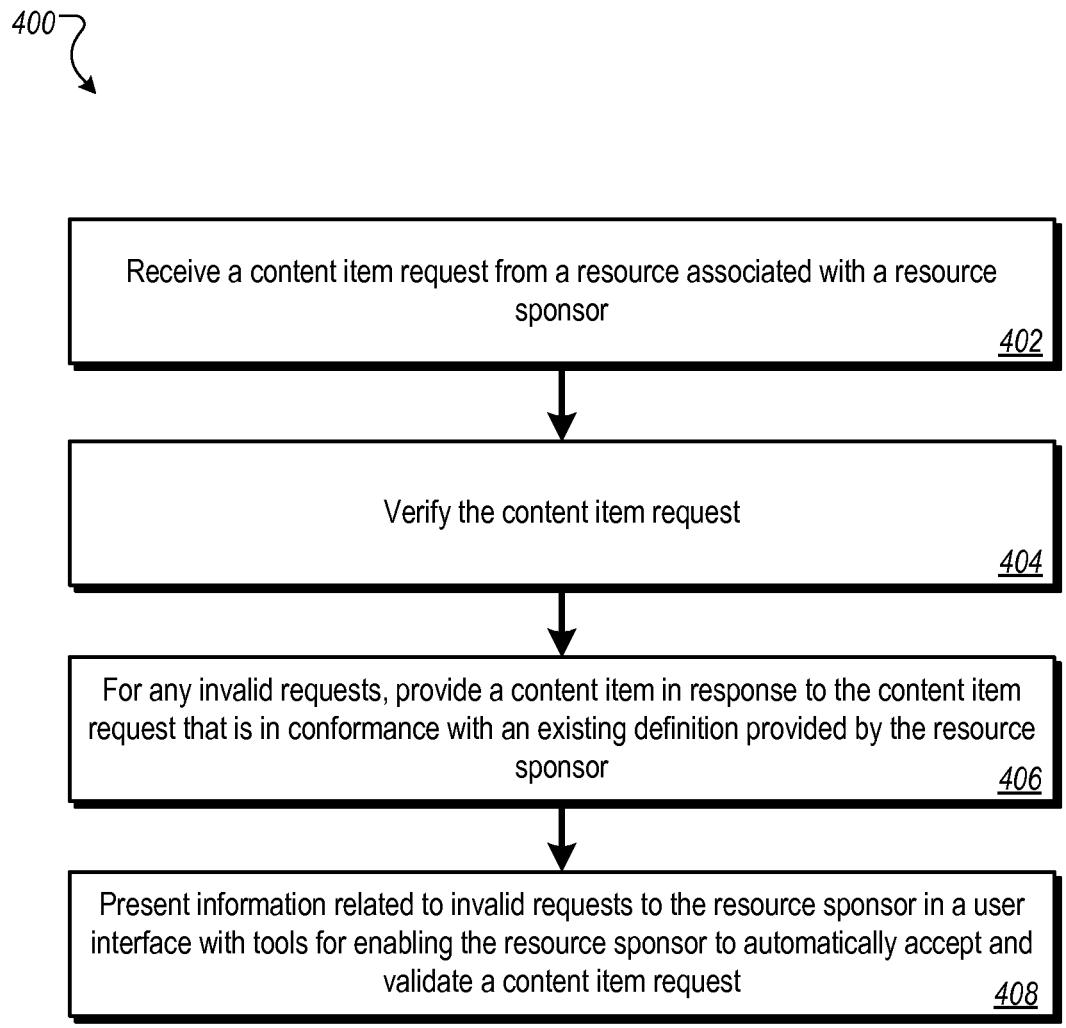
FIG. 4A is a flowchart of an example process for automatically generating advertisable entities from invalid requests for content.

FIG. 4A is a flowchart of an example process 400 for automatically generating advertisable entities from invalid requests for content. The process 400 can be performed by the content management system 110 and the resource sponsor user interface 120, for example, using the request handler 210, the verification engine 212, and the suggestion engine 220. FIGS. 2 and 3 are used to provide examples for steps of the process 400.

A content item request is received from a resource (402). The resource is associated with a resource sponsor. For example, the content management system 110 can receive the content item request 202 from the resource sponsor's web page 204. The content item request 202 can be a request for content to fill a content item slot, e.g., one of the content item slots 206a or 206b. For example, the content item slots 206a and 206b can be ad slots on the web page 204 that is sponsored by a resource sponsor in the music industry who may have several web pages related to music. In some implementations, the content item request 202 can be handled by the request handler 210.

The content item request is verified (404). The verification includes filtering out spam requests and determining if the content item request is valid. As an example, the verification engine 212 can verify the content item request 202, including determining if the content item request 202 is valid or invalid. For valid requests 208a, the verification engine 212 can determine that all of the information in the content item request 202 is correct. For invalid requests 208a, the verification engine 212 can determine, for example, that the content item request 202 is a spam request or that the content item request 202 contains at least some incorrect information such as typographical errors and/or missing or incorrect parameters (e.g., hierarchical level names as described earlier).

For any valid requests (e.g., valid requests 208a), a content item (e.g., the content item 214) is provided in response to the content item request 202. For some invalid requests, a content item can still be provided in response to the content item request (406). The content item, if provided for an invalid request, is in conformance with an existing definition provided by the resource sponsor. For example, if the verification engine 212 determines that the invalid request 208b contains correctable typographical errors and/or parameters (e.g., missing or incorrect level names), then the content management system 110 can provide the content item 214. The selection of the content item 214 can be based on correcting any correctable errors in the invalid request 208b. In some implementations, if, however, the errors in the invalid request 208b cannot be corrected, then no content item 214 is provided in response to the request for content 202.

Information related to invalid requests is presented to the resource sponsor in a user interface (408). The user interface includes tools for enabling the resource sponsor to automatically accept and validate a content item request so that subsequent requests of the same type are validated upon receipt. For example, resource sponsors can use interfaces such as the user interface 300 to view information about invalid requests and suggested advertisable entities that are suggested based on the invalid requests. The resource sponsor can use approval checkboxes 314, approve controls 316, and/or other controls to accept the suggestions.

Figure 4B:
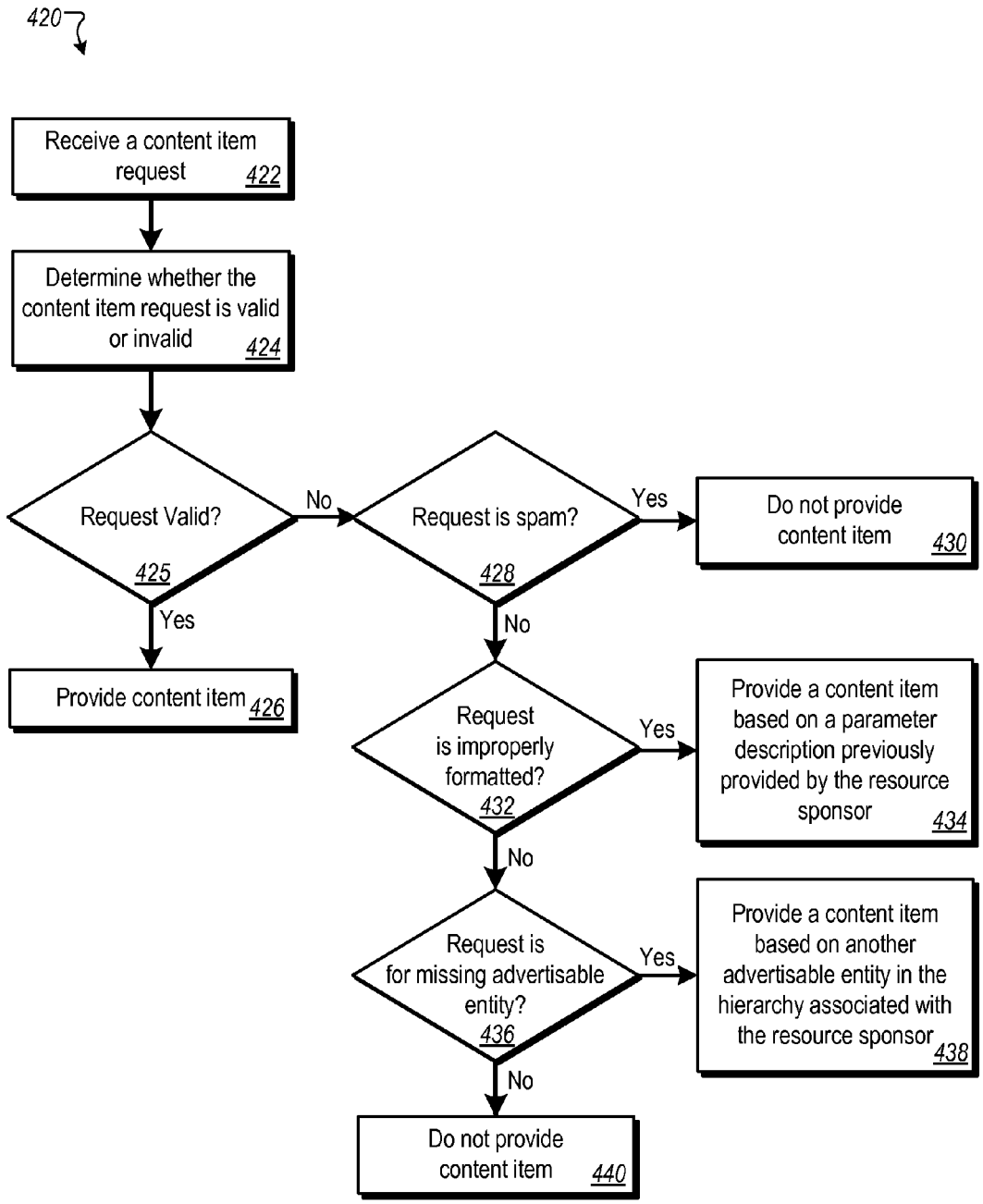
FIG. 4B is a flowchart of an example process for automatically generating advertisable entities from invalid requests for content and providing content in response to valid and invalid requests.

FIG. 4B is a flowchart of an example process 420 for automatically generating advertisable entities from invalid requests for content and providing content in response to valid and invalid requests. The process 420 can be performed by the content management system 110 and the resource sponsor user interface 120, for example, using the request handler 210, the verification engine 212, and the suggestion engine 220. FIGS. 2 and 3 are used to provide examples for steps of the process 420.

A content item request is received (422). Any content item received responsive to the content item request is to be displayed on a resource, the resource having an associated resource sponsor. For example, the content management system 110 can receive the content item request 202 from the resource sponsor's web page 204. The content item request 202 can be a request for content to fill a content item slot, e.g., one of the content item slots 206a or 206b. For example, the content item slots 206a and 206b can be ad slots on the web page 204 that is sponsored by a resource sponsor in the music industry who may have several web pages related to music. In some implementations, the content item request 202 can be handled by the request handler 210.

A determination is made whether the content item request is valid or invalid (424). The verification engine 212, for example, can determine whether the content item request 202 is valid or invalid, as described earlier.

If the request is valid (425), then content responsive to the content item request is provided (426). For example, the content management system 110 can provide the content item 214 in response to any valid request 208a, e.g., for presentation in the content item slot 206a.

For invalid requests, reasonable attempts can be made to provide content responsive to the content item request even though the request is invalid. In some implementations, the reason that the content item request is invalid can be overcome (e.g., corrected, interpreted, or substitute of a default definition), then content can be provided.

A determination is made whether the invalid request is spam (428). If the invalid request is spam (e.g., as determined by the verification engine 212), then a content item is not provided in response to the content item request (430). If the invalid request is not spam-related, processing can continue for the invalid request, such as to determine other reasons for invalidity.

A determination is made whether the invalid request is improperly formatted (432). If the invalid request is improperly formatted, then a content item responsive to the content item request is provided (434). The content item that is provided can be based at least in part on a parameter description previously provided by the resource sponsor. For example, the verification engine 212 can use information, including parameter descriptions, in the resource sponsor definitions 218 to determine and correct any typographical errors in the content item request 202. Using a corrected version of the content item request 202, the content management system 110 can provide content in response to the content item request 202, such as to the content sponsor's web page 204.

A determination is made whether the invalid request is a request for a missing advertisable entity in a hierarchy of advertisable entities (436). If so, then a content item responsive to the content item request is provided. The content item that is provided is based on another advertisable entity in the hierarchy associated with the resource sponsor (438). For example, as described above with reference to FIG. 2, level names, such as "jazz," "trumpet" or other names may be missing from the invalid request 208b. If the content management system 110, such as using information determined by the verification engine 212, can correct the missing information, then the content item 214 can be provided. For example, the dashed arrow 214b indicates the case in which the content item 214 can be provided for the content item slot 206b, even when the content item request 202 is invalid.

If all reasonable attempts have been made to overcome, correct, or interpret the invalid aspect of the content item request, then no content item is provided (440). Regardless of whether one or more content item(s) 214 are provided for invalid content item requests 202, the information for the invalid requests can be stored in the invalid content item requests 124, e.g., for use by the resource sponsor user interface and/or other users of the information.

Figure 4C:
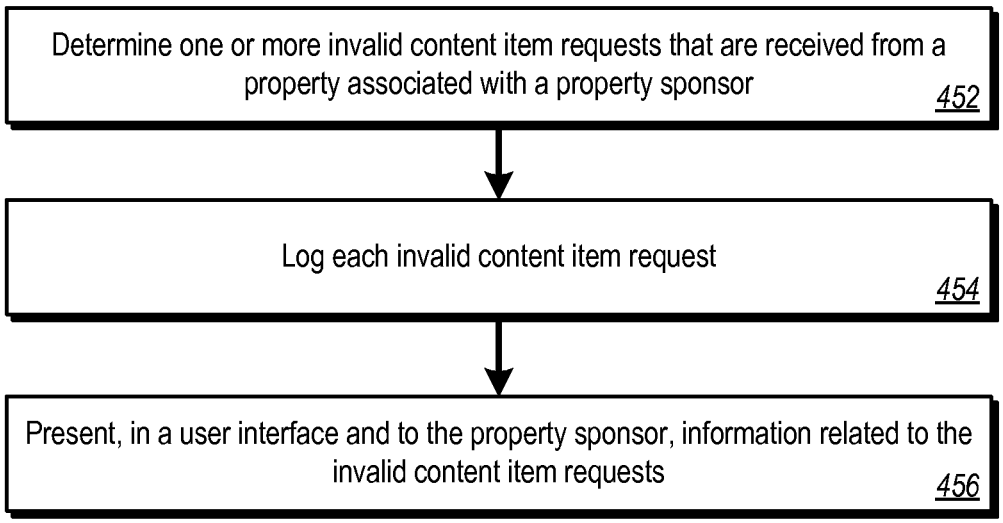
FIG. 4C is a flowchart of an example process for receiving, logging and presenting invalid content items associated with a property.

FIG. 4C is a flowchart of an example process 450 for receiving, logging and presenting invalid content items associated with a property. The process 450 can be performed by the content management system 110 and the resource sponsor user interface 120, for example, using the request handler 210, the verification engine 212, and the suggestion engine 220. FIGS. 2 and 3 are used to provide examples for steps of the process 450.

One or more invalid content item requests are determined that are received from a property associated with a property sponsor (452). For example, the content management system 110, e.g., using the verification engine 212, can determine that the content item request 202 received from a property (e.g., the content item slot 206b on the resource sponsor's web page 204) is invalid.

Each invalid content item request is logged (454). As an example, information corresponding to invalid requests 208b can be stored in the invalid content item requests 124.

Information related to the invalid content item requests is presented to the property sponsor in a user interface (456). For example, the property sponsor (e.g., a resource sponsor) can view information for invalid content item requests in one or more user interfaces such as the content sponsor user interface 120.

Figure 5:
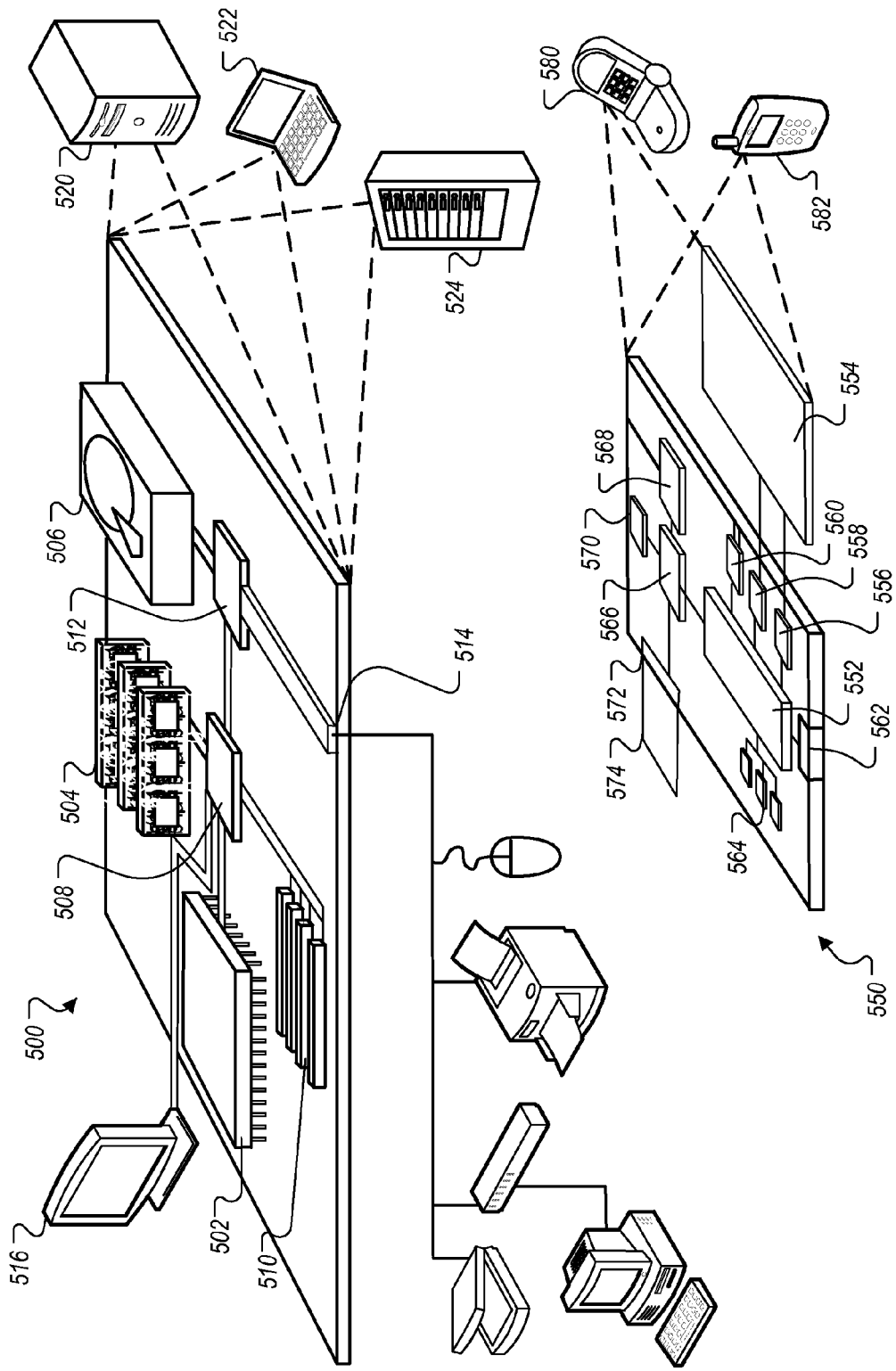
FIG. 5 is a block diagram of an example computer system that can be used to implement the methods, systems and processes described in this disclosure.

FIG. 5 is a block diagram of computing devices 500, 550 that may be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a computer-readable medium. In one implementation, the memory 504 is a volatile memory unit or units. In another implementation, the memory 504 is a non-volatile memory unit or units.

The storage device 506 is capable of providing mass storage for the computing device 500. In one implementation, the storage device 506 is a computer-readable medium. In various different implementations, the storage device 506 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of duties is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can process instructions for execution within the computing device 550, including instructions stored in the memory 564. The processor may also include separate analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD display or an OLED display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication (e.g., via a docking procedure) or for wireless communication (e.g., via Bluetooth or other such technologies).

The memory 564 stores information within the computing device 550. In one implementation, the memory 564 is a computer-readable medium. In one implementation, the memory 564 is a volatile memory unit or units. In another implementation, the memory 564 is a non-volatile memory unit or units. Expansion memory 574 may also be provided and connected to device 550 through expansion interface 572, which may include, for example, a SIMM card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS receiver module 570 may provide additional wireless data to device 550, which may be used as appropriate by applications running on device 550.

Device 550 may also communication audibly using audio codec 560, which may receive spoken information from a user and convert it to usable digital information. Audio codex 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
receiving, by one or more processors, a content item request from a resource, the resource associated with a resource sponsor;
verifying, by the one or more processors, the content item request including filtering out spam requests and determining if the content item request is valid;
for invalid requests, determining, by the one or more processors, whether the invalid request is spam, and if so, not providing a content item in response to the content item request;
for invalid requests, determining, by the one or more processors, whether the invalid request is improperly formatted, and if so, providing a content item responsive to the content item request including selecting a content item based at least in part on a parameter description previously provided by the resource sponsor;
for invalid requests, determining, by the one or more processors, whether the invalid request is a request for a missing advertisable entity in a hierarchy of advertisable entities, and if so, providing a content item responsive to the content item request including selecting a content item based on another advertisable entity in the hierarchy associated with the resource sponsor; and
providing, by the one or more processors, information related to invalid requests to the resource sponsor in a user interface, wherein the provided information related to invalid requests includes whether the invalid request is spam, improperly formatted or a request for a missing advertisable entity in a hierarchy of advertisable entities, the user interface including tools for enabling the resource sponsor to accept and validate an invalid content item request so that subsequent requests of the same type are validated upon receipt.

2. The method of claim 1 where the resource is a webpage and the resource sponsor is a publisher of the webpage.

3. The method of claim 1 where verifying the content item request includes verifying details associated with a content item slot associated with the request including examining a tag associated with the content item request.

4. The method of claim 1 where filtering spam requests includes filtering requests based on black lists.

5. The method of claim 1 where determining if the content item request is valid includes determining if the content item request includes a content item slot definition that is valid.

6. The method of claim 5 where determining if the content item slot definition is valid includes evaluating terms in a tag associated with the content item request.

7. The method of claim 1 where determining if the content item request is valid includes determining if a content item request is invalid, where an invalid request can be of the form of a request that includes a tag that includes one or more typographical errors that are correctable.

8. The method of claim 1 where determining if the content item request is valid includes determining an advertisable entity that is associated with the content item request and where the method further comprises determining if the content item request is invalid and includes an invalid advertisable entity specification.

9. The method of claim 8 where the advertisable entity is a content item slot definition that includes parameters defining how content is to be presented on the resource.

10. The method of claim 9 where determining the advertisable entity is invalid further includes determining one or more characteristics of the content item slot definition that are invalid generally or invalid specifically for the resource sponsor.

11. The method of claim 1 where, for invalid requests, providing a content item in response to the content item request further includes identifying at least one advertisable entity that is associated with the resource sponsor and providing a content item that is in conformance to the identified advertisable entity.

12. The method of claim 11 where the identified advertisable entity defines a content slot specified by the resource sponsor.

13. The method of claim 1 where providing information further includes providing suggestions for valid advertisable entities based at least in part on the received invalid content item requests.

14. The method of claim 13 where the invalid content item requests include invalid content item slot definitions.

15. The method of claim 14 where providing information further includes logging invalid content item requests.

16. The method of claim 15 further comprising identifying an invalid content item request and automatically determining a fix for the invalid content item request, where the method of providing information related to invalid content item requests includes providing invalid content items that have been fixed.

17. The method of claim 13 where providing information includes providing a tool to enable a resource sponsor to accept a suggested valid advertisable entity.

18. The method of claim 13 where the advertisable entities are content item slot definitions.

19. The method of claim 1 where providing information includes providing a tool to enable a user to fix an invalid content item request.

20. A method comprising:
   receiving, by one or more processors, a content item request, where any content item received responsive to the content item request is to be displayed on a resource, the resource having an associated resource sponsor;
   determining, by the one or more processors, whether the content item request is valid or invalid;
   for valid requests, providing, by the one or more processors, content responsive to the content item request;
   for invalid requests, determining, by the one or more processors, whether the invalid request is spam, and if so, not providing a content item in response to the content item request;
   for invalid requests, determining, by the one or more processors, whether the invalid request is improperly formatted, and if so, providing a content item responsive to the content item request including selecting a content item based at least in part on a parameter description previously provided by the resource sponsor; and
   for invalid requests, determining, by the one or more processors, whether the invalid request is a request for a missing advertisable entity in a hierarchy of advertisable entities, and if so, providing a content item responsive to the content item request including selecting a content item based on another advertisable entity in the hierarchy associated with the resource sponsor.

21. A non-transitory computer program product including instructions that, when executed, cause a processor to:
   receive a content item request from a resource, the resource associated with a resource sponsor;
   verify the content item request including filtering out spam requests and determining if the content item request is valid;
   for invalid requests, determine whether the invalid request is spam, and if so, not provide a content item in response to the content item request;
   for invalid requests, determine whether the invalid request is improperly formatted, and if so, provide a content item responsive to the content item request including selecting a content item based at least in part on a parameter description previously provided by the resource sponsor;
   for invalid requests, determine whether the invalid request is a request for a missing advertisable entity in a hierarchy of advertisable entities, and if so, provide a content item responsive to the content item request including selecting a content item based on another advertisable entity in the hierarchy associated with the resource sponsor; and
   provide information related to invalid requests to the resource sponsor in a user interface, wherein the provided information related to invalid requests includes whether the invalid request is spam, improperly formatted or a request for a missing advertisable entity in a hierarchy of advertisable entities, the user interface including tools for enabling the resource sponsor to accept and validate an invalid content item request so that subsequent requests of the same type are validated upon receipt.

22. The computer program product of claim 21 where the advertisable entity is a content item slot definition.

23. The computer program product of claim 21 where providing information includes providing suggestions to the resource sponsor for valid advertisable entities.

24. The computer program product of claim 21 where providing information includes providing the invalid content item requests that were received including a count of a number of invalid requests received.

25. The computer program product of claim 21 where providing information includes identifying an invalid content item request, determining a fix for correcting the invalid content item request, automatically correcting the invalid content item request and providing the corrected invalid content item request.

26. The computer program product of claim 21 where providing information includes providing a tool for accepting one or more provided content item requests as being valid.

27. The computer program product of claim 21 where providing information includes providing information for fixing one or more of the invalid content item requests.

28. A system comprising:
   a processor;
   a memory including instructions; and
   a content management system that provides content items responsive to received requests, the content management system including a request handler, a verification engine, and a suggestion engine;
   where the request handler is enabled to receive content item requests and provide content items in response to the received content item requests;
   where the verification engine is enabled to:
      verify content item requests including filtering out spam requests and to determine whether the content item requests are valid or invalid; and
      for invalid requests, determine whether the invalid request is spam, and if so, not provide a content item in response to the content item request;
      for invalid requests, determine whether the invalid request is improperly formatted, and if so, provide a content item responsive to the content item request including selecting a content item based at least in part on a parameter description previously provided by the resource sponsor;
      for invalid requests, determine whether the invalid request is a request for a missing advertisable entity in a hierarchy of advertisable entities, and if so, provide a content item responsive to the content item request including selecting a content item based on another advertisable entity in the hierarchy associated with the resource sponsor; and where the suggestion engine is enabled to provide information related to invalid requests to the resource sponsor in a user interface, wherein the provided information related to invalid requests includes whether the invalid request is spam, improperly formatted or a request for a missing advertisable entity in a hierarchy of advertisable entities, the user interface including tools for enabling the resource sponsor to accept and validate an invalid content item request so that subsequent requests of the same type are validated upon receipt.

\* \* \* \* \*